(12) United States Patent
Hada

(10) Patent No.: US 11,531,327 B2
(45) Date of Patent: Dec. 20, 2022

(54) ABNORMALITY DETERMINATION DEVICE AND ABNORMALITY DETERMINATION SYSTEM

(71) Applicant: FANUC Corporation, Yamanashi (JP)

(72) Inventor: Keita Hada, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 201 days.

(21) Appl. No.: 16/925,341

(22) Filed: Jul. 10, 2020

(65) Prior Publication Data

US 2021/0018904 A1 Jan. 21, 2021

(30) Foreign Application Priority Data

Jul. 16, 2019 (JP) .............................. JP2019-131452

(51) Int. Cl.
*G05B 23/02* (2006.01)
*G06N 20/00* (2019.01)

(52) U.S. Cl.
CPC ......... *G05B 23/0218* (2013.01); *G06N 20/00* (2019.01)

(58) Field of Classification Search
CPC ........................... G05B 23/0218; G06N 20/00
USPC ..................................................... 700/78–89
See application file for complete search history.

(56) References Cited

U.S. PATENT DOCUMENTS

| 10,051,452 | B2* | 8/2018 | Tuan ..................... H04W 4/027 |
| 2017/0242076 | A1* | 8/2017 | Yoshiura ............... G01R 31/343 |
| 2017/0300753 | A1* | 10/2017 | Billi ....................... H04N 5/765 |
| 2018/0031587 | A1* | 2/2018 | Bierweiler ........ G01N 35/00693 |
| 2018/0081328 | A1* | 3/2018 | Lu ........................... G05B 17/02 |
| 2018/0262525 | A1* | 9/2018 | Yan ...................... H04L 63/1425 |
| 2019/0068618 | A1* | 2/2019 | Mestha ............... H04L 63/1425 |
| 2019/0188110 | A1* | 6/2019 | Ueyama .............. G06F 11/3433 |
| 2019/0258223 | A1* | 8/2019 | Oota ..................... G05B 19/406 |

FOREIGN PATENT DOCUMENTS

JP 2017151598 A 8/2017

OTHER PUBLICATIONS

Boglietti, Aldo, et al. "Evolution and modern approaches for thermal analysis of electrical machines." IEEE Transactions on industrial electronics 56.3 (2009): pp. 871-882. (Year: 2009).*
Di Benedetto, Maria Domenica, Alberto Sangiovanni-Vincentelli, and Tiziano Villa. "Model matching for finite-state machines." IEEE Transactions on Automatic Control 46.11 (2001): pp. 1726-1743. (Year: 2001).*

(Continued)

*Primary Examiner* — Satish Rampuria
(74) *Attorney, Agent, or Firm* — Hauptman Ham, LLP

(57) ABSTRACT

An abnormality determination device acquires observation data observed during an operation of an industrial machine, extracts partial time-series data, including a portion representative of a feature of an operating state at a specified timing, from the observation data, calculates a statistical amount from the extracted partial time-series data, and performs processing for machine learning related to determination of operation abnormality of the industrial machine, based on the calculated statistical amount.

12 Claims, 12 Drawing Sheets

(56) References Cited

OTHER PUBLICATIONS

Fu, Qiang, et al. "Execution anomaly detection in distributed systems through unstructured log analysis." 2009 ninth IEEE international conference on data mining. IEEE, 2009. pp. 149-158. (Year: 2009).*

Wan, Jiafu, et al. "Software-defined industrial internet of things in the contextof industry 4.0." IEEE Sensors Journal 16.20 (2016): pp. 7373-7380. (Year: 2016).*

Pires, Ivan Miguel, et al. "From data acquisition to data fusion: a comprehensive review and a roadmap for the identification of activities of daily living using mobile devices." Sensors 16.2 (2016): pp. 1-27. (Year: 2016).*

Mazhar, Muhammad Shoaib, et al. "Forensic Analysis on Internet of Things (IoT) Device Using Machine-to-Machine (M2M) Framework." Electronics 11.7 (2022): pp. 1-23. (Year: 2022).*

\* cited by examiner

ABNORMALITY DETERMINATION DEVICE AND ABNORMALITY DETERMINATION SYSTEM

RELATED APPLICATIONS

The present application claims priority to Japanese Patent Application Number 2019-131452 filed Jul. 16, 2019, the disclosure of which is hereby incorporated by reference herein in its entirety.

BACKGROUND OF THE INVENTION

Field of the Invention

The present invention relates to an abnormality determination device and an abnormality determination system.

Description of the Related Art

Industrial machines such as machine tools and robots are installed in factories and other manufacturing sites, and workers are operating these industrial machines to manufacture products. As the industrial machines continue to be operated on site, abnormality may sometimes occur in the behaviors of the industrial machines due to aging degradations of components of the industrial machines, external factors such as changes in the outdoor air temperature and vibrations, workers' setting mistakes, or the like. If the behavior of any of the industrial machines is determined to be abnormal, a worker stops the operation of the industrial machine, removes the cause of the abnormality, and then resumes the operation of the machine to continue the work.

There is a method for determining abnormality of an industrial machine based on physical quantities detected from the industrial machine by sensors or the like. As one such determination method, an abnormality determination method is a well-known method that is based on an unsupervised learning method such as the VAE (Variational Auto-Encoder) or the MT System (Mahalanobis-Taguchi System).

FIG. 13 is a diagram illustrating an operation abnormality determination method for an industrial machine based on unsupervised learning using physical quantities.

In the operation abnormality determination method for an industrial machine based on unsupervised learning, a normal data model is created using, for example, physical quantities (motor torque commands, etc.) acquired while the industrial machine is normally operating. Then, the rate of divergence between the created normal data model and the physical quantities acquired from the industrial machine to be verified is calculated, and the behavior of the industrial machine is determined to be abnormal if a divergence of a specified value or more is recognized (e.g., Japanese Patent Application Laid-Open No. 2017-151598).

In a case in which the operation abnormality of the industrial machine is determined based on measured physical quantities, it is to be desired that the determination be performed based on a plurality of physical quantities acquired at a plurality of different times, not performed independently for a physical quantity acquired at a single time, in order to accurately determine the normality. However, in order to accurately perform the determination using the physical quantities acquired at a plurality of different times, it is necessary to perform machine learning with each of a plurality of time data, so that the necessary frequency of learning increases. Moreover, depending on the activity of the industrial machine to be detected, it may sometimes be difficult to take frequent data. For example, a collision or the like may possibly result in a failure of the industrial machine if it is repeated many times, so that it is difficult to frequently take data on such an action.

Nevertheless, if learning is performed based only on data on a specific time, only the specific time data can be used for the normality determination, so that erroneous detection based on noise that is easily noticeable in a global point of view is caused to increase.

As another problem, if a plurality of physical quantities acquired at a plurality of times are learned together, the learning may sometimes include time divisions free of the appearance of normality features. If the learning is performed including data on these time divisions free of the appearance of normality features, it will reduce the learning effect of features indicated by data on time divisions in which the normality features appear. For example, since torque fluctuations and the like attributable to programming are data that are obviously irrelevant to machine abnormality, they are expected to be excluded from learning objects.

As a further problem, if operating conditions of the industrial machine, especially driving conditions (rotational frequency, etc.) of a motor for driving the industrial machine, are changed, data such as the torque commands also change. Therefore, if a model used is created based only on data acquired in a specified operating condition, correct normality determination cannot be achieved for data detected in a different operating condition. However, operating conditions set for the industrial machine in a manufacturing site vary depending on the purpose and cannot be put together into one. Also, there are parameters, such as the ambient temperature, that cannot be controlled by the worker's will, and a huge amount of data is required to create models in consideration of all these parameters.

SUMMARY OF THE INVENTION

Accordingly, there is a demand for learning and determination methods capable of efficiently performing machine learning and determination of the operating state of an industrial machine.

Thereupon, an abnormality determination device according to the present invention solves the above problem by using data having with a predetermined duration as a feature quantity, not data at a specific time.

An abnormality determination device according to one aspect of the present invention is configured to determine abnormality of an industrial machine and includes an observation data acquisition unit configured to acquire, as observation data, continuous data on an operation of the industrial machine observed during the operation, a statistical amount extraction unit configured to extract, from the observation data, partial time-series data including a portion representative of a feature of an operating state at a predetermined specified timing, and calculate at least one statistical amount from the partial time-series data, and a machine learning device configured to perform processing for machine learning related to determination of operation abnormality of the industrial machine, based on the statistical amount calculated by the statistical amount extraction unit.

The machine learning device may further include a learning unit configured, as the machine learning processing, to generate a learning model that has learned the statistical amount calculated by the statistical amount extraction unit.

The machine learning device may further comprise a machine abnormality determination unit configured to calculate, as the machine learning processing, a rate of divergence of the statistical amount learned by machine learning from normality, based on the statistical amount calculated by the statistical amount extraction unit, and determine machine abnormality of the industrial machine based on the calculated rate of divergence.

The statistical amount calculated by the statistical amount extraction unit may be at least one of values including a maximum value, minimum value, local maximal value, local minimal value, average value, deviation, kurtosis, skewness, and value calculated by combining these values.

The abnormality determination device may further comprise a correction unit configured to correct the observation data in accordance with operating conditions of the industrial machine.

Moreover, a system according to one aspect of the present invention is a system including a plurality of devices connected to one another through a network, and the plurality of devices include at least the aforementioned abnormality determination device, as a first abnormality determination device.

The plurality of devices may include a computer comprising a machine learning device, the computer may acquire a learning model as a result of the learning by at least one of the abnormality determination devices, and the machine learning device of the computer may perform optimization or streamlining based on the acquired learning model.

The plurality of devices may include a second abnormality determination device different from the first abnormality determination device, and the result of the learning by the first abnormality determination device may be shared with the second abnormality determination device.

The plurality of devices may include a second abnormality determination device different from the first abnormality determination device, and data observed in the second abnormality determination device may be made available for the learning by the first abnormality determination device through the network.

According to the present invention having the above structure, data need not be repeatedly observed for learning at a lot of times, so that efficient learning and determination can be performed.

DETAILED DESCRIPTION OF THE PREFERRED EMBODIMENTS

Figure 1:
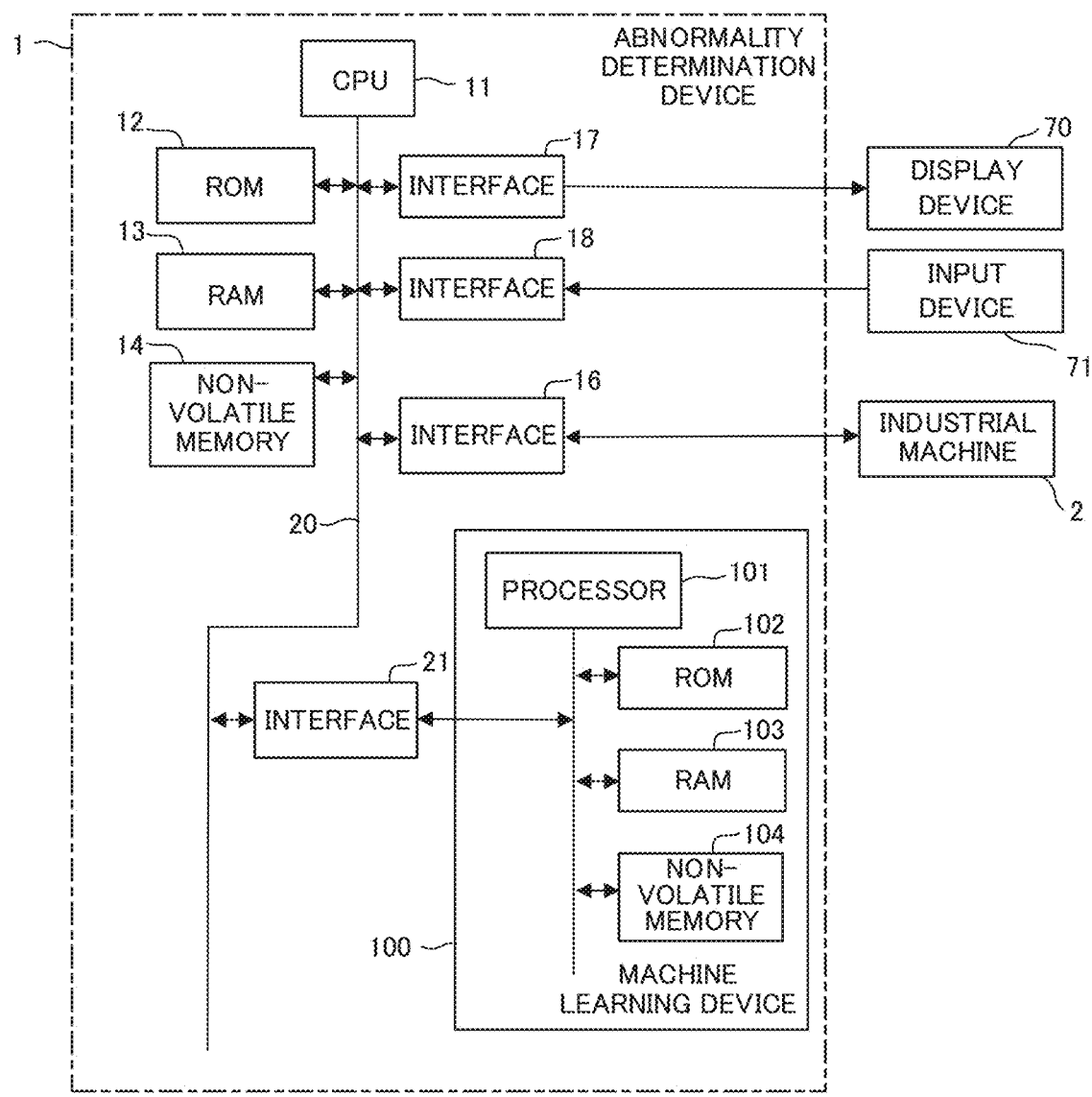
FIG. 1 is a schematic hardware configuration diagram of an abnormality determination device according to one embodiment.

FIG. 1 is a schematic hardware configuration diagram showing principal parts of an abnormality determination device with a machine learning device according to one embodiment.

An abnormality determination device 1 of the present embodiment can, for example, be mounted on a controller for controlling an industrial machine, or can be implemented as a computer, such as a personal computer attached to the controller for controlling the industrial machine or an edge computer, fog computer, or cloud server connected to the controller through a wired/wireless network. In the illustrated example of the present embodiment, the abnormality determination device 1 is implemented as the personal computer attached to a controller for controlling the industrial machine.

A CPU 11 of the abnormality determination device 1 according to the present embodiment is a processor for generally controlling the abnormality determination device 1. The CPU 11 reads out a system program stored in a ROM 12 via a bus 20 and controls the entire abnormality determination device 1 according to this system program. A RAM 13 is temporarily loaded with temporary calculation data, various data input by a worker through an input device 71, and the like.

A non-volatile memory 14 is composed of, for example, a memory, a solid state drive (SSD), or the like backed up by a battery (not shown) so that its storage state can be maintained even when the power source (not shown) of the abnormality determination device 1 is turned off. The non-volatile memory 14 stores a setting area loaded with setting information related to the operation of the abnormality determination device 1 and data (data indicative of the operating state of an industrial machine 2, etc.) input from the input device 71, time-series data on various data (position, speed, and acceleration of a drive motor of the industrial machine 2, sound, vibration, and temperature detected by sensors attached to the industrial machine 2, etc.) to be acquired from the industrial machine 2, data read through external equipment (not shown) or the network, and the like. Programs and various data stored in the non-volatile memory 14 may be developed in the RAM 13 during execution and use. Moreover, system programs including conventional analysis programs for analyzing the various data, programs for controlling exchange with a machine learning device 100 (described later), and the like are previously written in the ROM 12.

The industrial machine 2 is a machine such as a machine tool, electrical discharge machine, injection molding machine, transfer machine, or robot used on a production floor. The industrial machine 2 has a function of outputting data (position, speed, and acceleration of the drive motor, etc.) detectable during the operation and data (sound, vibration, temperature, etc.) detected by the sensors (not shown) attached to the industrial machine 2.

Data obtained as a result of execution of the data, programs, and the like read onto the memory, data output from the machine learning device 100 (described later), and the like are output to a display device 70 through an interface 17 and displayed on it. Moreover, the input device 71, which is composed of a keyboard, pointing device, and the like, delivers commands, data, and the like based on the worker's operation to the CPU 11 through an interface 18.

Figure 2:
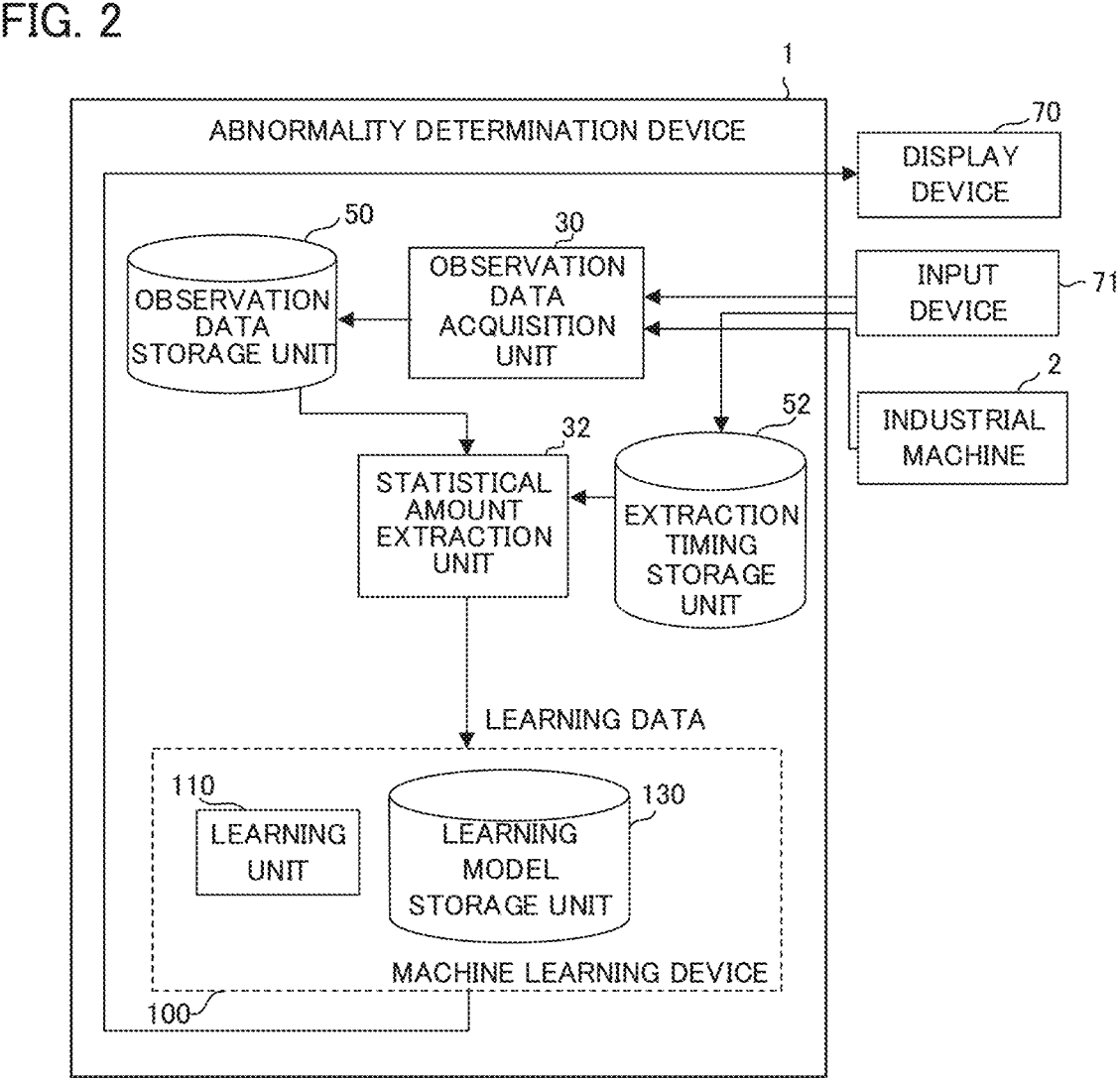
FIG. 2 is a schematic functional block diagram of an abnormality determination device according to a first embodiment.

An interface 21 is an interface for connecting the CPU 11 and the machine learning device 100. The machine learning device 100 includes a processor 101 configured to control the entire machine learning device 100, a ROM 102 that stores system programs and the like, a RAM 103 for temporary storage in each step of processing related to machine learning, and a non-volatile memory 104 used to store learning models and the like. The machine learning device 100 can observe pieces of information (e.g., data indicative of the operating state of the industrial machine 2, position, speed, and acceleration of the drive motor of the industrial machine 2, sound, vibration, and temperature detected by the sensors attached to the industrial machine 2, etc.) that can be acquired by the abnormality determination device 1 through the interface 21. Moreover, the abnormality determination device 1 acquires, through the interface 21, the result of processing output from the machine learning device 100, stores and displays the acquired result, and transmits it to another device through a network (not shown) or the like FIG. 2 is a schematic functional block diagram of an abnormality determination device 1 and a machine learning device 100 according to a first embodiment.

The abnormality determination device 1 of the present embodiment has a configuration required when the machine learning device 100 learns the operating state of a machine tool (learning mode). Each functional block shown in FIG. 2 is implemented as the CPU 11 of the abnormality determination device 1 and the processor 101 of the machine learning device 100 shown in FIG. 1 execute their respective system programs and control the operation of each part of the abnormality determination device 1 and the machine learning device 100.

The abnormality determination device 1 of the present embodiment includes an observation data acquisition unit 30 and a statistical amount extraction unit 32, and the machine learning device 100 of the abnormality determination device 1 includes a learning unit 110. Moreover, an observation data storage unit 50 that stores observation data acquired from the industrial machine 2 and the like and an extraction timing storage unit 52 that stores a predetermined extraction timing for a statistical amount through an input device 71 or the like are provided on the non-volatile memory 14 shown in FIG. 1. Furthermore, a learning model storage unit 130 configured to store learning models constructed by machine learning by the learning unit 110 is provided on the non-volatile memory 104 of the machine learning device 100 shown in FIG. 1.

The observation data acquisition unit 30 is implemented as the CPU 11 of the abnormality determination device 1 shown in FIG. 1 executes a system program read out from the ROM 12 and mainly the CPU 11 performs arithmetic processing using the RAM 13 and the non-volatile memory 14. The observation data acquisition unit 30 stores data on the operating state acquired from the industrial machine 2, data indicative of the operating state of the industrial machine 2 acquired from the input device 71, and the like in the observation data storage unit 50. The observation data acquisition unit 30 acquires data on a specific operating state of the industrial machine 2 and stores the same as the observation data in the observation data storage unit 50. For example, if a diagnosis on the normality of the operation of the industrial machine 2 is expected to be performed in the abnormality determination device 1, the observation data acquisition unit 30 should only store data acquired during a normal operation of the industrial machine 2, as the observation data, in the observation data storage unit 50.

Figure 3:
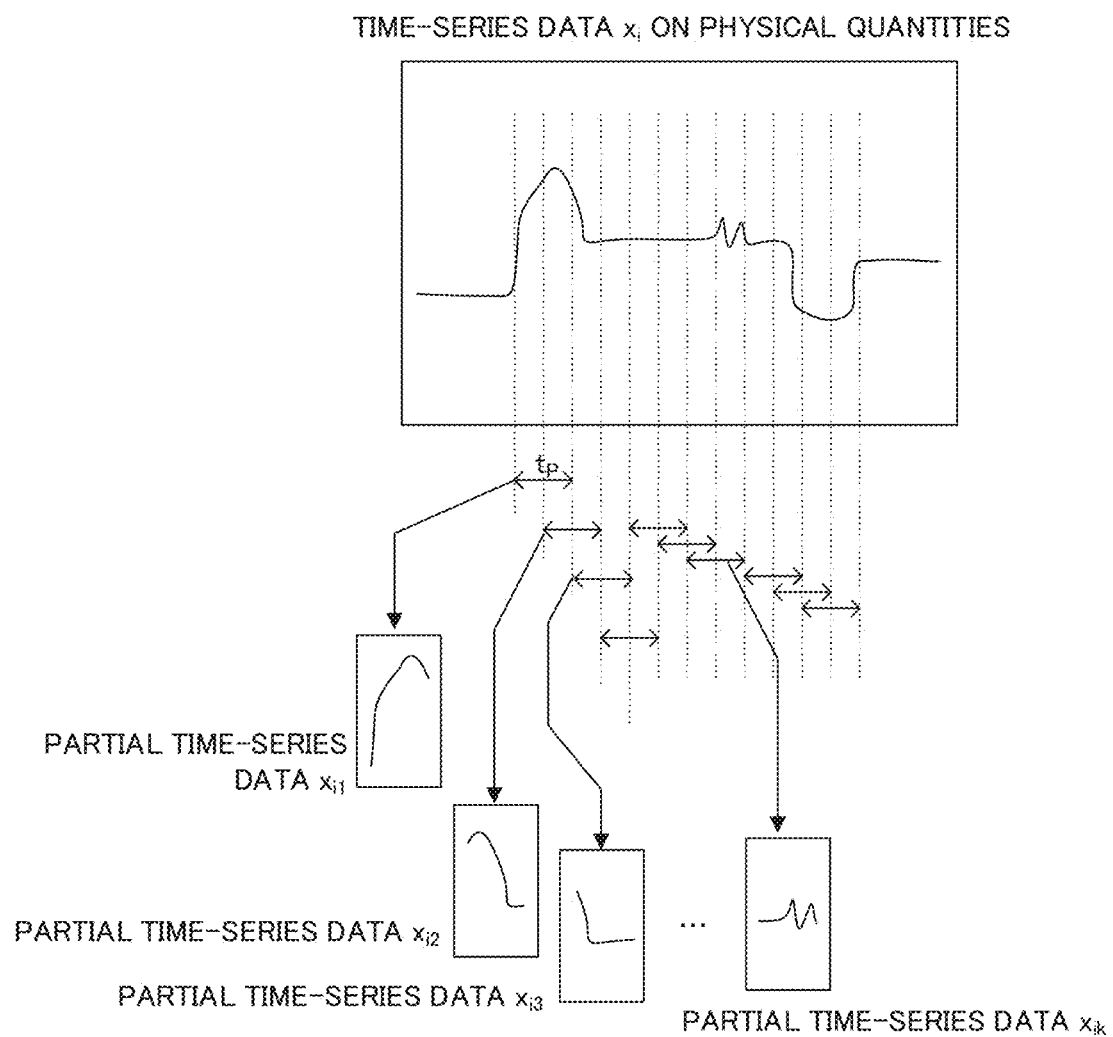
FIG. 3 is a diagram showing an example of extraction of partial time-series data.

The statistical amount extraction unit 32 is implemented as the CPU 11 of the abnormality determination device 1 shown in FIG. 1 executes the system program read out from the ROM 12 and mainly the CPU 11 performs the arithmetic processing using the RAM 13 and the non-volatile memory 14. The statistical amount extraction unit 32 extracts data having a specified duration from the observation data stored in the observation data storage unit 50 and calculates a statistical amount related to the extracted data. If the observation data to be stored in the observation data storage unit 50 is time-series data on a physical quantity, the statistical amount extraction unit 32 extracts partial time-series data cut with a predetermined specified duration $t_p$ from the observation data at a predetermined specified timing, as illustrated in FIG. 3.

Figure 4:
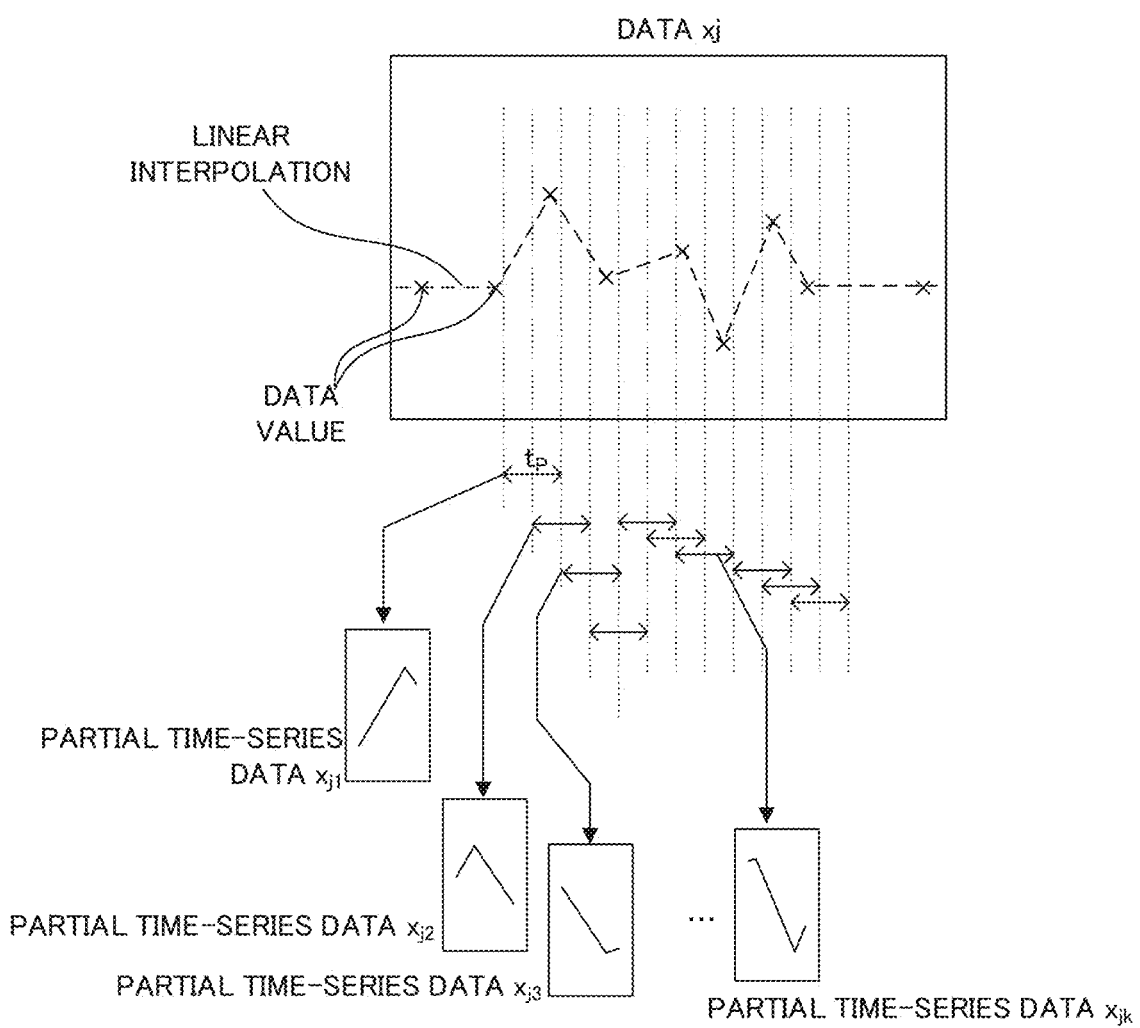
FIG. 4 is a diagram showing another example of extraction of the partial time-series data.

If multiple pieces of data observed at predetermined times are stored in the observation data storage unit 50, the statistical amount extraction unit 32 may create time-series data obtained by interpolating a data value at a time free of observation by a specified algorithm of linear interpolation or the like and extract therefrom the partial time-series data cut with the predetermined specified duration $t_p$ at the predetermined specified timing, as illustrated in FIG. 4. The worker should only previously set the timing for the extraction of the partial time-series data from the observation data in the extraction timing storage unit 52 through the input device 71 or the like, in consideration of the operating characteristics of the machine. For example, if a position in which characteristic data is generated in the observation data is known in advance, that part of the data acquired at a timing corresponding to that position should only be extracted as the partial time-series data. While the timing for the extraction of the partial time-series data may be designated by a specified elapsed time since the start of the machine operation, the extraction timing may be made definable by some other specified physical quantities, such as the coordinate position and speed range of the machine, as well as by the time as aforesaid.

The statistical amount extraction unit 32 calculates a specified statistical amount for the created partial time-series data. The specified statistical amount calculated by the statistical amount extraction unit 32 may be a maximum value, minimum value, local maximal value, local minimal value, average value, deviation, kurtosis, skewness, or some other statistically calculated value within the time period indicated by the partial time-series data or a value calculated based on a combination of those values. The specified statistical amount calculated by the statistical amount extraction unit 32 should only be one that indicates the waveform characteristics of the partial time-series data, for example.

Also, the statistical amount extraction unit 32 may be designed to perform filtering processing, such as previous removal of high-frequency noise, on the observation data in advance, prior to the extraction of the partial time-series data from the observation data. In this way, unexpectedly detected noise or the like that is not required in determining the normality of the operation of the industrial machine 2 can be removed to prevent erroneous detection.

The learning unit 110 is implemented as the processor 101 of the abnormality determination device 1 shown in FIG. 1 executes the system program read out from the ROM 102 and mainly the processor 101 performs the arithmetic processing using the RAM 103 and the non-volatile memory 104. The learning unit 110 performs machine learning using the statistical amount calculated by the statistical amount extraction unit 32 as learning data. The learning unit 110 generates a learning model that has learned a statistical amount of the partial time-series data on a physical quantity acquired from the industrial machine 2 during its normal operation by performing machine learning based on a conventional unsupervised learning technique, such as the VAE or MT method, and stores the same in the learning model storage unit 130.

The learning unit 110 is an essential structure in the stage of learning. After learning of the state of the industrial machine 2 by the learning unit 110 is completed, however, the learning unit 110 is not necessarily essential. For example, the learning unit 110 may be removed when the machine learning device 100 for which the learning is completed is to be shipped to a customer or the like.

The abnormality determination device 1 according to the present embodiment having the above structure generates the learning model that has learned the state of the industrial machine 2. The learning model generated here can be supposed to be generated as a result of completion of execution of learning based on the partial time-series data acquired at a predetermined timing. Moreover, a specified statistical amount is calculated for the partial time-series data and used for learning. Therefore, as compared with the case in which the learning is performed using the data acquired at each of a plurality of times, the learning can be finished with a lower frequency based on features included in a plurality of physical quantities.

Figure 5:
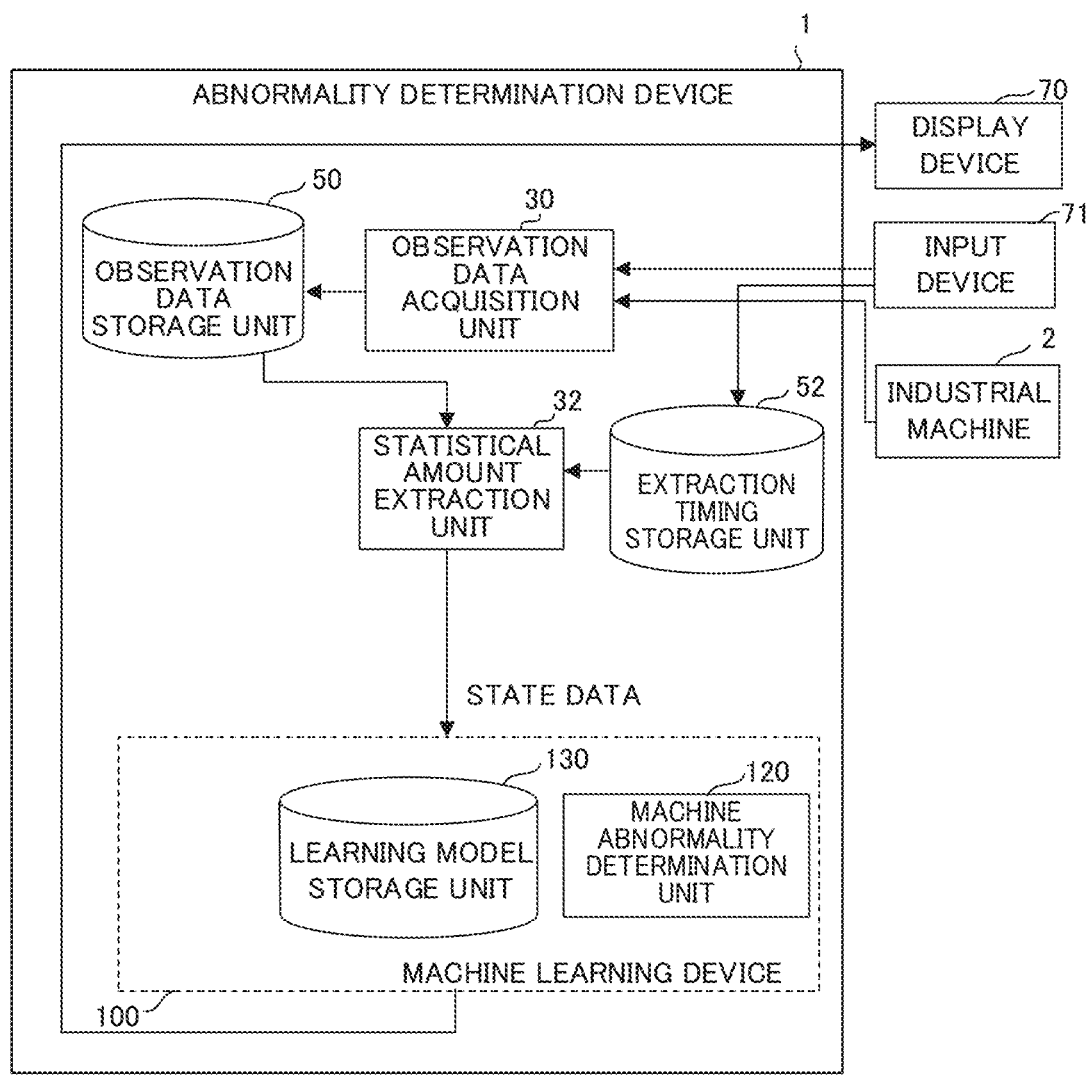
FIG. 5 is a schematic functional block diagram of an abnormality determination device according to a second embodiment.

FIG. 5 is a schematic functional block diagram of an abnormality determination device 1 and a machine learning device 100 according to a second embodiment.

The abnormality determination device 1 of the present embodiment has a configuration required when the machine learning device 100 diagnoses the operating state of an industrial machine 2 (determination mode). Each functional block shown in FIG. 5 is implemented as the CPU 11 of the abnormality determination device 1 and the processor 101 of the machine learning device 100 shown in FIG. 1 execute their respective system programs and control the operation of each part of the abnormality determination device 1 and the machine learning device 100.

The abnormality determination device 1 of the present embodiment includes an observation data acquisition unit 30 and a statistical amount extraction unit 32, and the machine learning device 100 of the abnormality determination device 1 includes a machine abnormality determination unit 120. Moreover, an observation data storage unit 50 that stores data acquired from the industrial machine 2 and the like and an extraction timing storage unit 52 that stores a predetermined extraction timing for a statistical amount through an input device 71 or the like are provided on the non-volatile memory 14 shown in FIG. 1. Furthermore, a learning model storage unit 130 configured to store learning models constructed by machine learning by the learning unit 110 described in connection with the first embodiment is provided on the non-volatile memory 104 of the machine learning device 100 shown in FIG. 1.

The observation data acquisition unit 30 and the statistical amount extraction unit 32 according to the present embodiment have the same functions as the observation data acquisition unit 30 and the statistical amount extraction unit 32 according to the first embodiment.

The machine abnormality determination unit 120 is implemented as the processor 101 of the abnormality determination device 1 shown in FIG. 1 executes the system program read out from the ROM 102 and mainly the processor 101 performs the arithmetic processing using the RAM 103 and the non-volatile memory 104. The machine abnormality determination unit 120 performs determination of the operating state of the industrial machine 2 using a learning model stored in the learning model storage unit 130, based on a feature quantity of the partial time-series data extracted by the statistical amount extraction unit 32 as state data indicative of the current state. The machine abnormality determination unit 120 of the present embodiment performs a specified computation with a learning model which is generated by the learning unit 110 (or, or which a parameter is set) and calculates a rate of divergence indicative of the degree of divergence of the state data from the normal state. If a predetermined specified threshold is exceeded by the calculated rate of divergence, the operation of the industrial machine 2 is determined to be abnormal. The state of the industrial machine 2 determined by the machine abnormality determination unit 120 may be either output for display on the display device 70 or output for transmission to another device through a network (not shown) or the like.

The abnormality determination device 1 according to the present embodiment having the above structure is enabled to determine the divergence between a learned state and another state by using the learning model that has learned the state of the industrial machine 2. For example, the abnormality determination device 1 can diagnose the normal and abnormal states of the industrial machine 2 by using the learning model generated based on the data acquired during the normal operation of the industrial machine 2.

Figure 6:
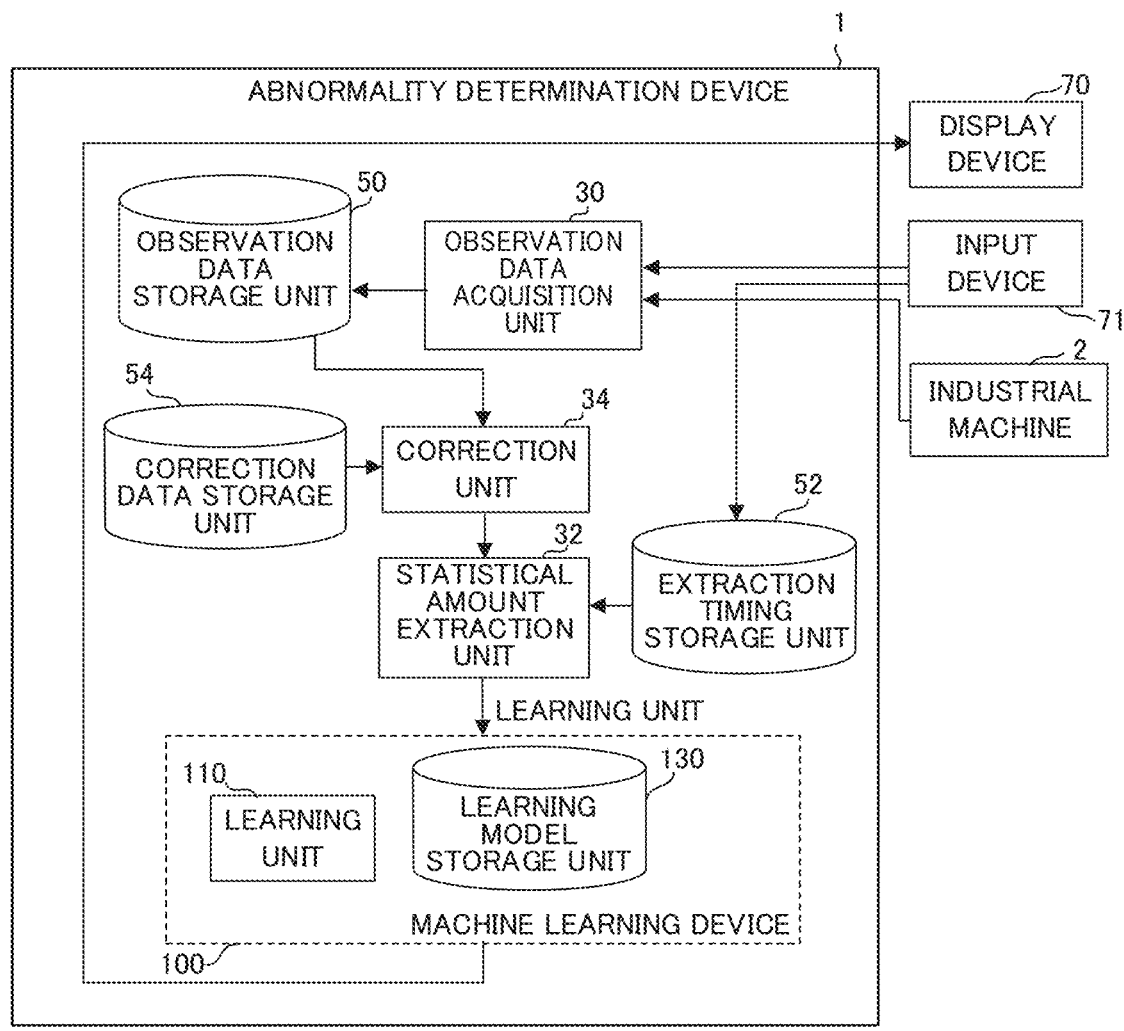
FIG. 6 is a schematic functional block diagram of an abnormality determination device according to a third embodiment.

FIG. 6 is a schematic functional block diagram of an abnormality determination device 1 and a machine learning device 100 according to a third embodiment.

The abnormality determination device 1 of the present embodiment has a configuration required when the machine learning device 100 learns the operating state of a machine tool (learning mode). Each functional block shown in FIG. 6 is implemented as the CPU 11 of the abnormality determination device 1 and the processor 101 of the machine learning device 100 shown in FIG. 1 execute their respective system programs and control the operation of each part of the abnormality determination device 1 and the machine learning device 100.

The abnormality determination device 1 of the present embodiment includes an observation data acquisition unit 30, statistical amount extraction unit 32, and correction unit 34, and the machine learning device 100 of the abnormality determination device 1 includes a learning unit 110. Moreover, an observation data storage unit 50 that stores observation data acquired from an industrial machine 2 and the like, an extraction timing storage unit 52 that stores a predetermined extraction timing for a statistical amount through an input device 71 or the like, and a correction data storage unit 54 that has previously stored data on the correction of the observation data according to operating conditions are provided on the non-volatile memory 14 shown in FIG. 1. Furthermore, a learning model storage unit 130 configured to store learning models constructed by machine learning by the learning unit 110 is provided on the non-volatile memory 104 of the machine learning device 100 shown in FIG. 1.

The observation data acquisition unit 30 and the statistical amount extraction unit 32 according to the present embodiment have the same functions as the observation data acquisition unit 30 and the statistical amount extraction unit 32 according to the first embodiment.

The correction unit 34 is implemented as the CPU 11 of the abnormality determination device 1 shown in FIG. 1 executes the system program read out from the ROM 12 and mainly the CPU 11 performs the arithmetic processing using the RAM 13 and the non-volatile memory 14. The correction unit 34 corrects the observation data in accordance with the operating conditions of the industrial machine 2. The correction unit 34 corrects the observation data stored in the observation data storage unit 50, based on a correction formula, conversion table, or the like for each observation data with respect to the operating conditions of the industrial machine 2 stored in the correction data storage unit 54, and outputs the corrected observation data to the statistical amount extraction unit 32.

The correction data storage unit 54 should only store a conversion formula (coefficient of a conversion formula) or conversion table obtained between, for example, the value of a physical quantity observed as the observation data when an operation (normal or abnormal operation) is previously performed in a reference operating condition by an experiment or the like and the value of a physical quantity observed as the observation data when an operation (similar normal or abnormal operation) is performed in another specified operating condition. The correction formula or conversion table to be stored in the correction data storage unit 54 should only be set so as to correct the observation data so that the rates of divergence calculated by the machine learning device take similar values when similar abnormal states are generated in different operating conditions.

The abnormality determination device 1 according to the present embodiment having the above structure can generate the learning model that has learned by a similar standard even if the operating conditions of the industrial machine 2 are different in learning the state of the industrial machine 2. Therefore, the industrial machine 2 need not be operated for learning in a plurality of operating conditions and the learning can be finished with a lower frequency.

Figure 7:
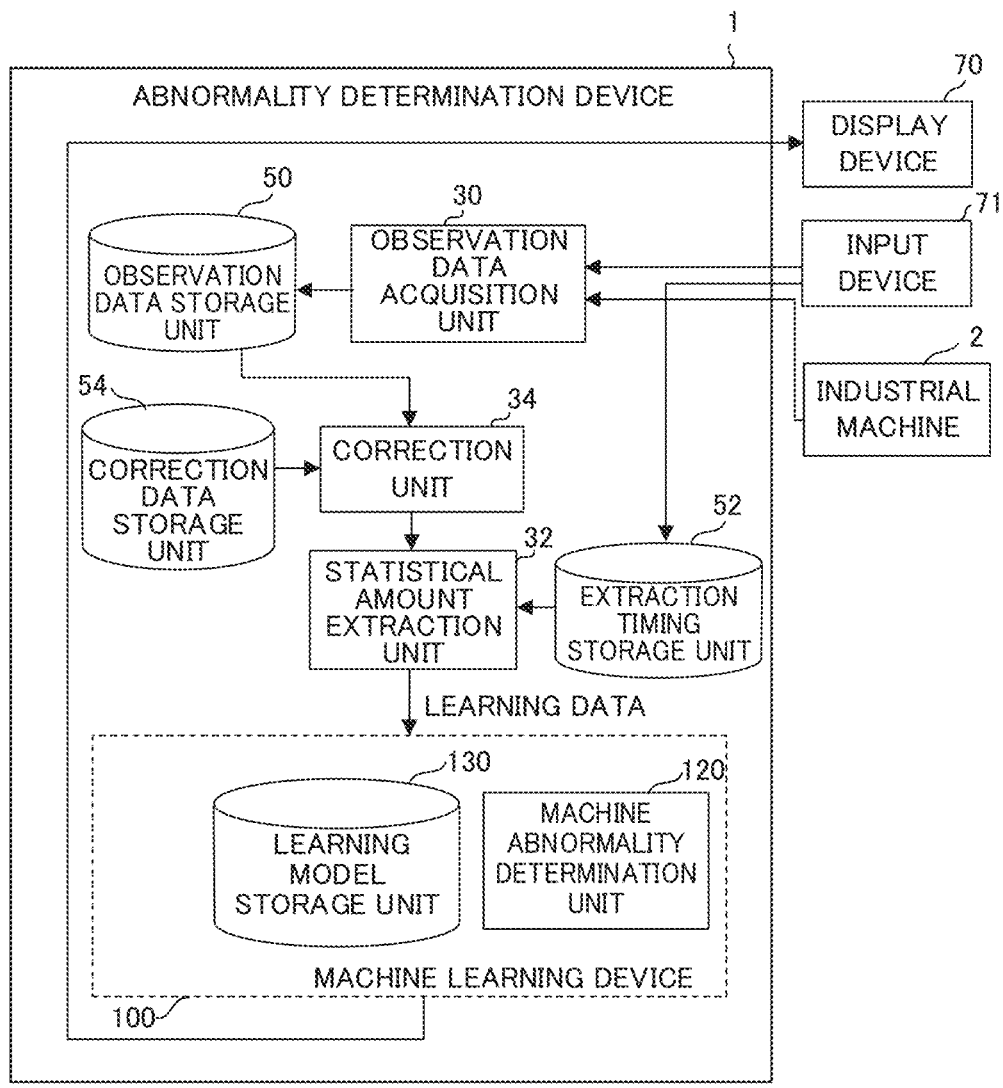
FIG. 7 is a schematic functional block diagram of an abnormality determination device according to a fourth embodiment.

FIG. 7 is a schematic functional block diagram of an abnormality determination device 1 and a machine learning device 100 according to a fourth embodiment.

The abnormality determination device 1 of the present embodiment has a configuration required when the machine learning device 100 learns the operating state of a machine tool (determination mode). Each functional block shown in FIG. 7 is implemented as the CPU 11 of the abnormality determination device 1 and the processor 101 of the machine learning device 100 shown in FIG. 1 execute their respective system programs and control the operation of each part of the abnormality determination device 1 and the machine learning device 100.

The abnormality determination device 1 of the present embodiment includes an observation data acquisition unit 30, statistical amount extraction unit 32, and correction unit 34, and the machine learning device 100 of the abnormality determination device 1 includes a machine abnormality determination unit 120. Moreover, an observation data storage unit 50 that stores observation data acquired from an industrial machine 2 and the like, an extraction timing storage unit 52 stored with a predetermined extraction timing for a statistical amount through an input device 71 or the like, and a correction data storage unit 54 that has previously stored data on the correction of the observation data according to operating conditions are provided on the non-volatile memory 14 shown in FIG. 1. Furthermore, a learning model storage unit 130 configured to store learning models constructed by machine learning by the learning unit 110 is provided on the non-volatile memory 104 of the machine learning device 100 shown in FIG. 1.

The observation data acquisition unit 30, statistical amount extraction unit 32, and correction unit 34 according to the present embodiment have the same functions as the observation data acquisition unit 30, statistical amount extraction unit 32, and correction unit 34 according to the third embodiment. Moreover, the machine abnormality determination unit 120 according to the present embodiment has the same functions as the machine abnormality determination unit 120 according to the second embodiment.

The abnormality determination device 1 according to the present embodiment having the above structure is enabled to correct the observation data for use in accordance with the operating conditions, in determining the divergence between a learned state and another state, by using the learning model that has learned the state of the industrial machine 2. Therefore, the operating states of the industrial machine 2 can also be correctly determined by using the learning model generated based on the observation data observed in different operating conditions.

The following fifth to seventh embodiments will be described as being each implemented as a part of a system in which each of the abnormality determination devices 1 according to the first to fourth embodiments is connected to a plurality of devices including a cloud server, host computer, fog computers, and edge computers (robot controllers, controllers, etc.) through a wired/wireless network.

Figure 8:
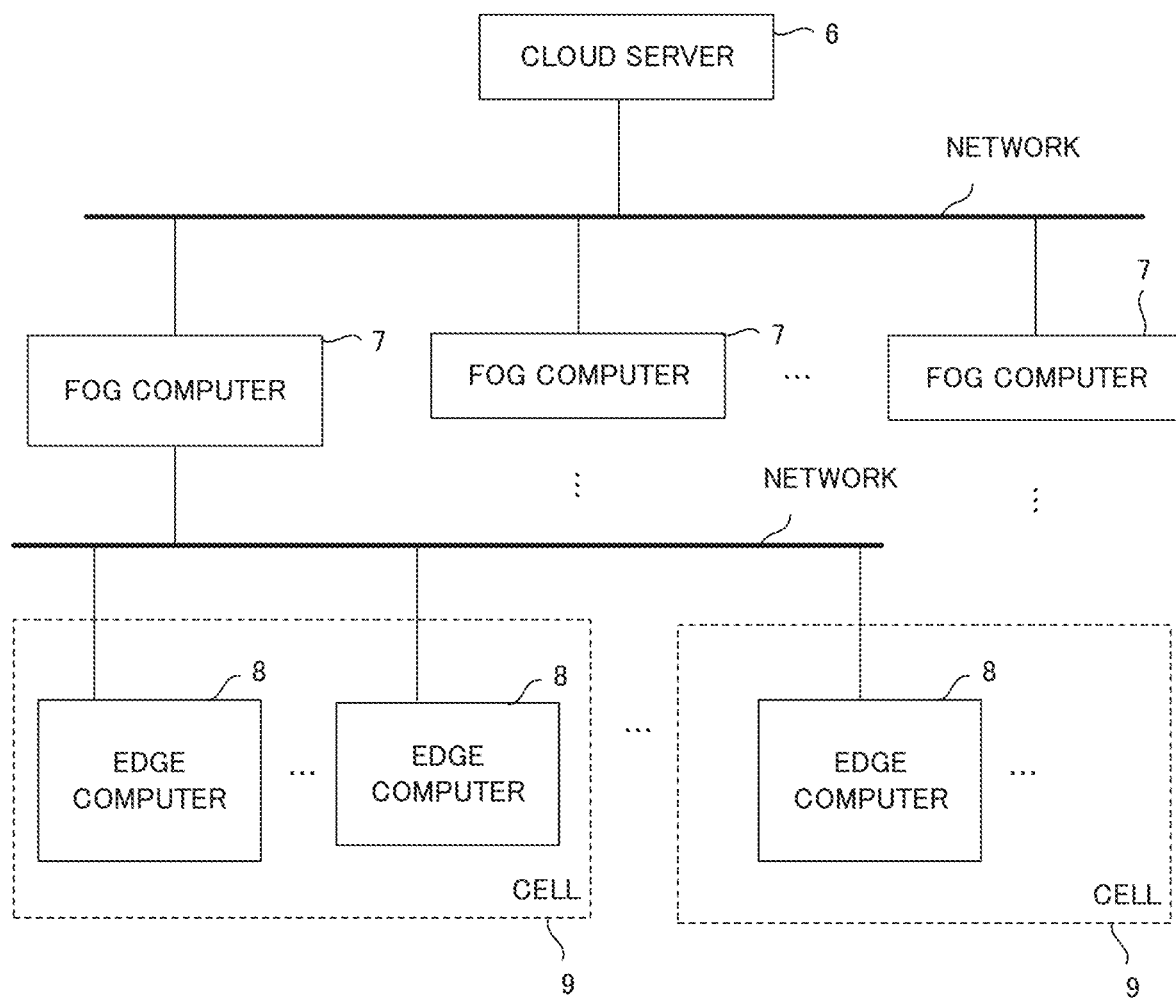
FIG. 8 is a diagram showing an example of a three-layer structure including a cloud server, fog computers, and edge computers.

In the following fifth to seventh embodiments, as illustrated in FIG. 8, a system is assumed that is logically divided into three layers; a layer including the cloud server 6 and the like, a layer including the fog computers 7 and the like, and a layer including the edge computers 8 (robot controllers, controllers, etc., included in cells 9), with each of a plurality of devices connected to the network. In such a system, the abnormality determination device 1 according to one aspect of the present invention can be implemented on any of the cloud server 6, fog computers 7, and edge computers 8, and can perform distributed learning with data to be used for processing related to machine learning shared with the individual devices through the network, perform a large-scale analysis of generated learning models collected in the fog computers 7 and the cloud server 6, and moreover, mutually reuse the generated learning models.

In the system illustrated in FIG. 8, a plurality of cells 9 are provided in a factory in each place, and the fog computers 7 in the upper layer manage the individual cells 9 in predetermined units (e.g., for each factory or in units of a plurality of factories of one and the same manufacturer). These data collected and analyzed by the fog computers 7 are subjected to collection, analysis, and the like by the cloud server 6 in the further upper layer. Resulting information can be used for control in each edge computer 8 and the like.

Figure 9:
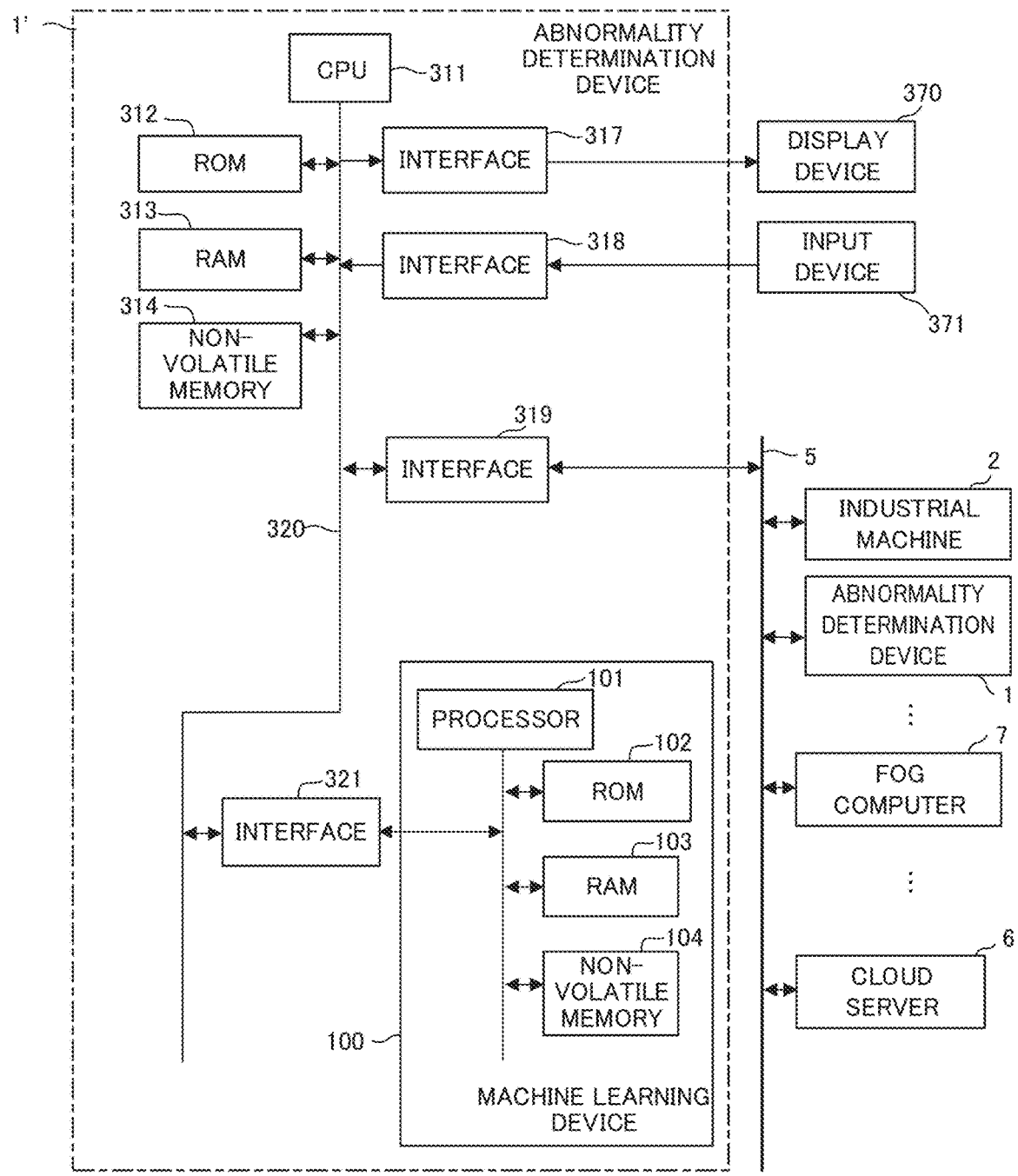
FIG. 9 is a schematic hardware configuration diagram of an abnormality determination device implemented on computers.

FIG. 9 is a schematic hardware configuration diagram showing a case in which an abnormality determination device is implemented on computers.

A CPU 311 of an abnormality determination device 1' implemented on the computers according to the present embodiment is a processor for generally controlling the abnormality determination device 1'. The CPU 311 reads out a system program stored in a ROM 312 via a bus 320 and controls the entire abnormality determination device 1' in accordance with this system program. A RAM 313 temporarily stores temporary calculation data and display data, various data input by an operator through an input unit (not shown), and the like.

A non-volatile memory 314 is constructed as a memory that is, for example, backed up by a battery (not shown) so that its storage state can be maintained even when the power source of the abnormality determination device 1' is turned off. The non-volatile memory 314 stores programs input through an input device 371 and various data acquired from the industrial machine 2 or the like through each part of the abnormality determination device 1' or the network 5. The programs and the various data stored in the non-volatile memory 314 may be developed in the RAM 313 during execution and use. Moreover, various system programs (including programs for controlling exchange with a machine learning device 100 described later) such as conventional analysis programs are previously written in the ROM 312.

The abnormality determination device 1' is connected to the wired/wireless network 5 through an interface 319. The network 5 is connected with at least one industrial machine 2, another abnormality determination device 1, edge computer 8, fog computer 7, cloud server 6, and the like and mutually exchanges data with the abnormality determination device 1'.

Data obtained as a result of execution of the data, programs, and the like read onto the memory and the like are output to a display device 370 through an interface 317 and displayed on it. Moreover, the input device 371, which is composed of a keyboard, pointing device, and the like, delivers commands, data, and the like based on the worker's operation to the CPU 311 through an interface 318.

An interface 321 is an interface for connecting the abnormality determination device 1' and the machine learning device 100. The machine learning device 100 has the same structure as the one described with reference to FIG. 1.

Thus, the functions of the abnormality determination device 1' are the same as those described in connection with the first to fourth embodiments except that the acquisition of information from the industrial machine 2 and the transmission of the result of determination of the operating state of the industrial machine 2 are exchanged through the network 5 in the case in which the abnormality determination device 1' is implemented on computers such as the cloud server and the fog computer.

Figure 10:
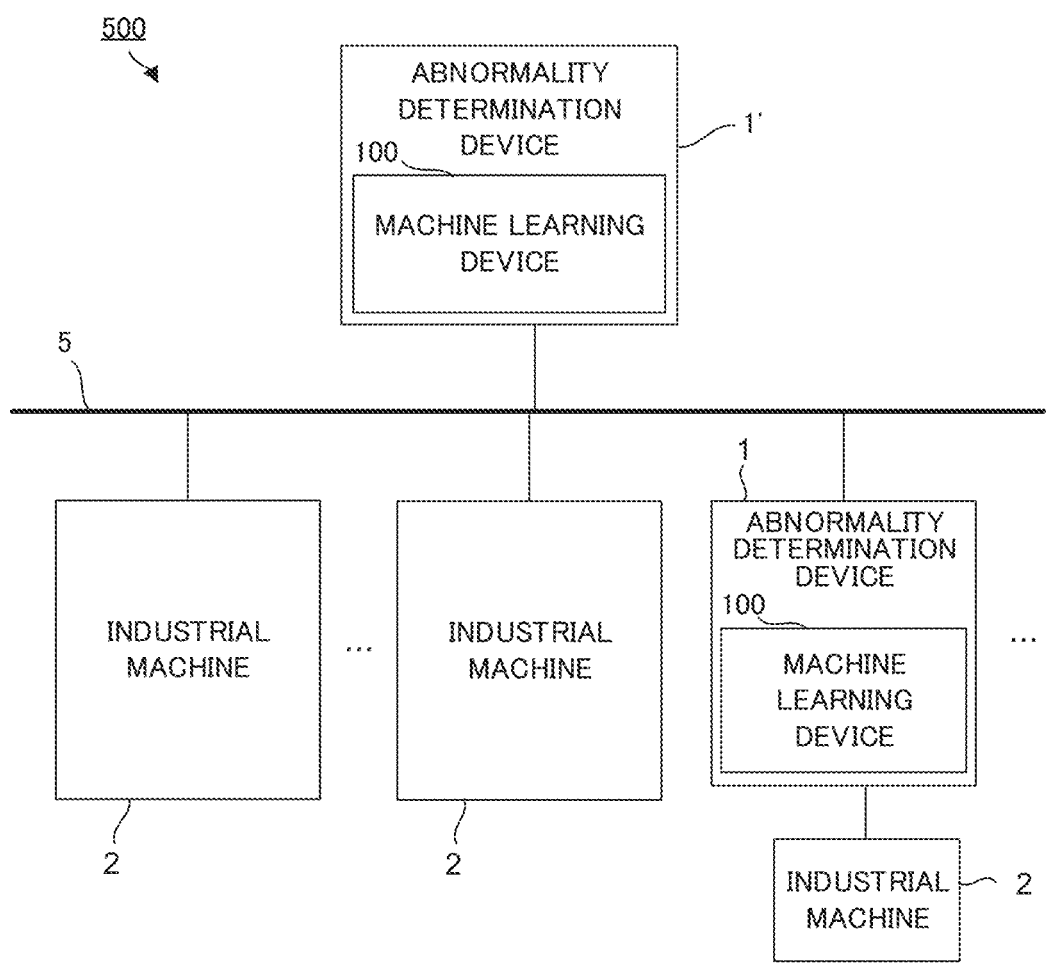
FIG. 10 is a schematic configuration diagram of an abnormality determination system according to a fifth embodiment.

FIG. 10 is a schematic configuration diagram of an abnormality determination system according to a fifth embodiment including the abnormality determination device 1'.

The abnormality determination system 500 includes a plurality of abnormality determination devices 1 and 1', a plurality of industrial machines 2, and a network 5 connecting the abnormality determination devices 1 and 1' and the industrial machines 2 to one another.

In the abnormality determination system 500, the abnormality determination device 1' with the machine learning device 100 determines the operating states of the industrial machines 2 using the result of learning by the learning unit 110. Moreover, at least one abnormality determination device 1' can be constructed so as to learn the operating states of the industrial machines 2 common to all the abnormality determination devices 1 and 1', based on the observation data obtained by the individual other abnormality determination devices 1 and 1', and the result of the learning is shared by all the abnormality determination devices 1 and 1'. Therefore, according to the abnormality determination system 500, a set of more diverse observation data can be input to improve the speed and reliability of the learning.

Figure 11:
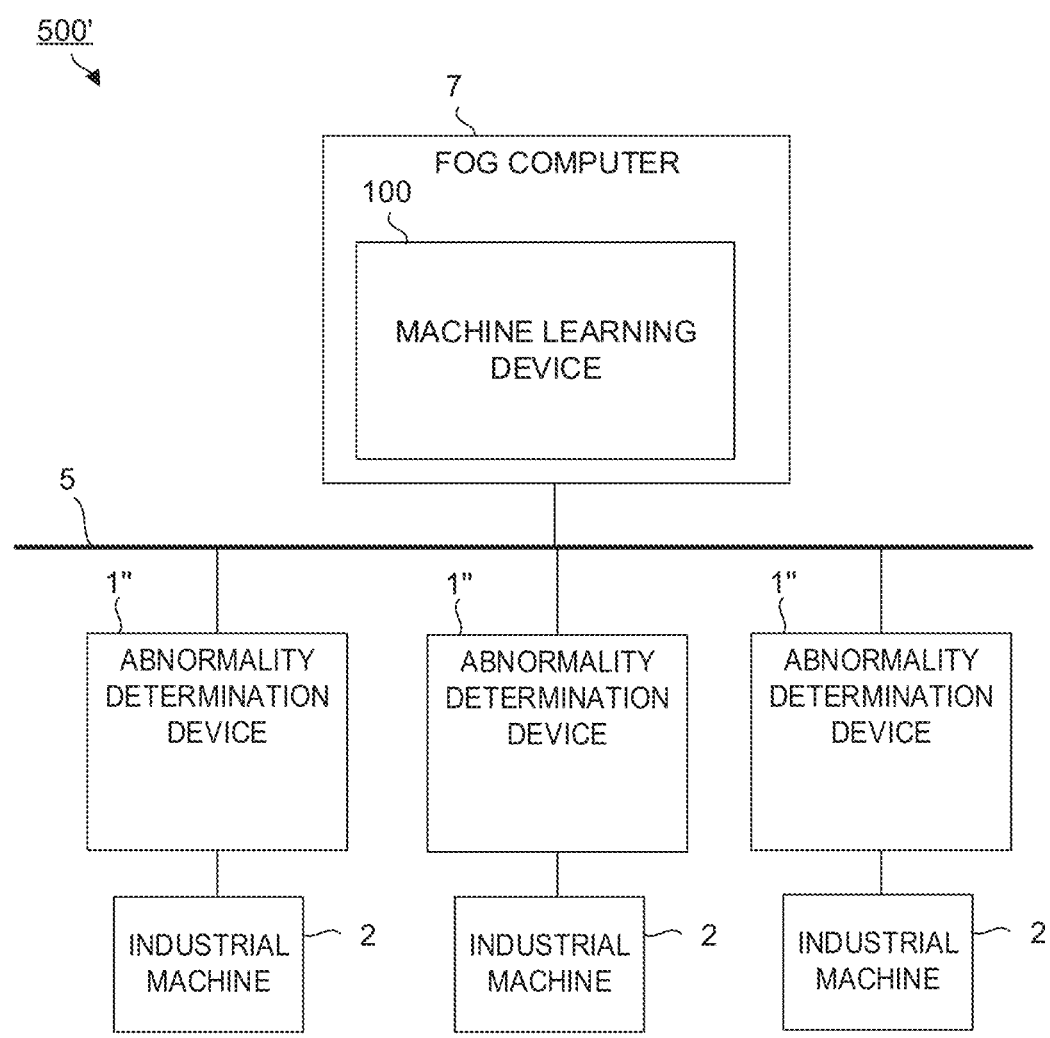
FIG. 11 is a schematic configuration diagram of an abnormality determination system according to a sixth embodiment.

FIG. 11 is a schematic configuration diagram of an abnormality determination system according to a sixth embodiment in which a machine learning device and abnormality determination devices are implemented on different devices The abnormality determination system 500' includes at least one machine learning device 100 implemented as a part of a computer, such as a cloud server, host computer, or fog computer (implemented as a part of a fog computer 7 in the example shown in FIG. 11), a plurality of abnormality determination devices 1", and a network 5 connecting those abnormality determination devices 1" and the computer. The hardware configuration of the computer, like the schematic hardware configuration of the abnormality determination device 1' shown in FIG. 9, is constructed so that hardware components of conventional computers, such as a CPU 311, RAM 313, and non-volatile memory 314, are connected via a bus 320.

The abnormality determination system 500' having the above structure is designed so that the machine learning device 100 can learn the operating states of the industrial machines 2 common to all the abnormality determination devices 1", based on the observation data obtained for the individual abnormality determination devices 1", and determine the respective operating states of the industrial machines 2 using the result of the learning. According to the structure of the abnormality determination system 500', a necessary number of abnormality determination devices 1" can be connected to the machine learning device 100 as required without regard to respective places and times where the individual abnormality determination devices 1" exist.

Figure 12:
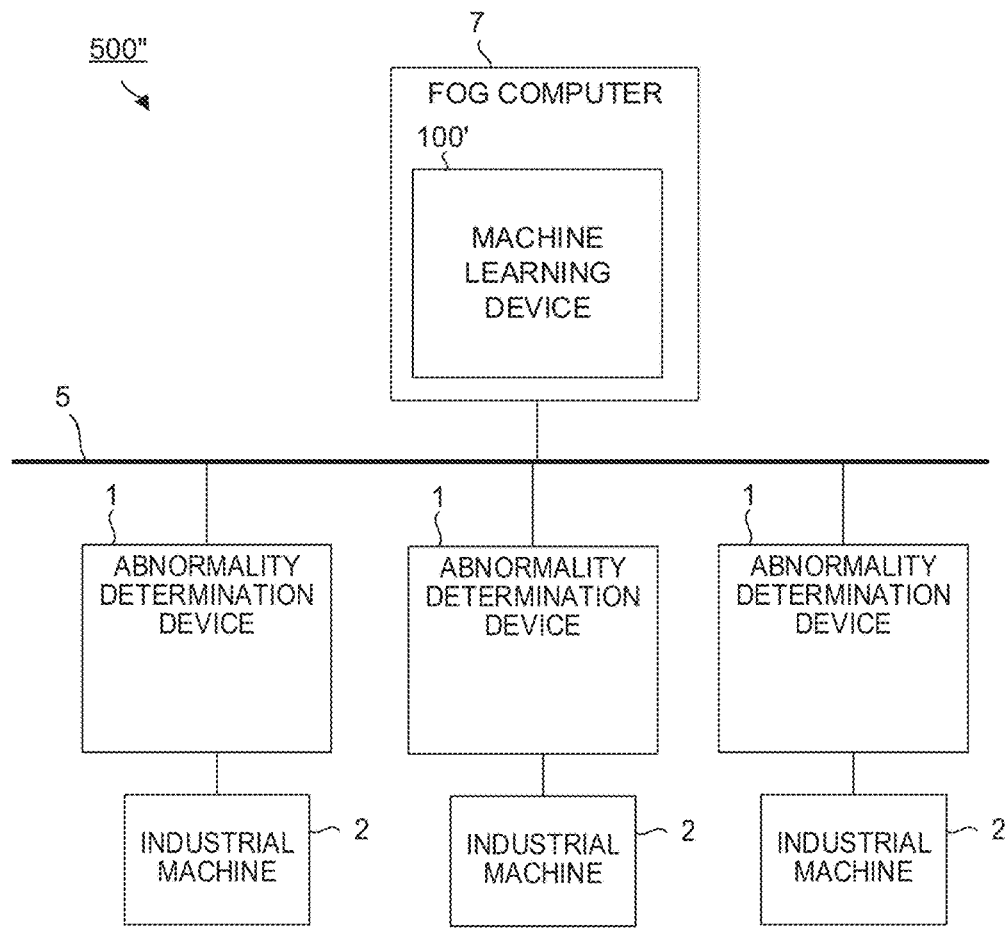
FIG. 12 is a schematic configuration diagram of an abnormality determination system according to a seventh embodiment.
Figure 13:
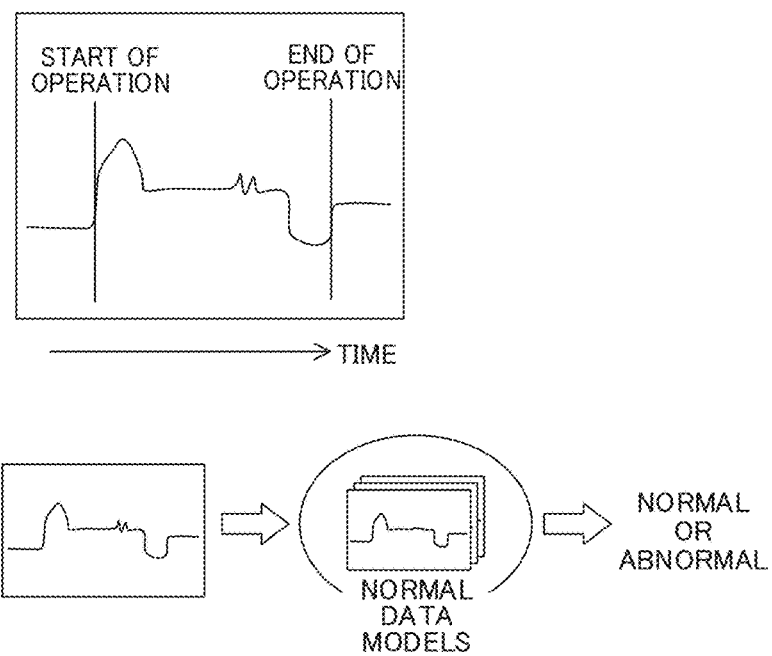
FIG. 13 is a diagram illustrating a method of determining operation abnormality of an industrial machine by unsupervised learning using physical quantities.

FIG. 12 is a schematic configuration diagram of an abnormality determination system 500" according to a seventh embodiment including a machine learning device 100' and abnormality determination devices 1.

The abnormality determination system 500" includes at least one machine learning device 100' implemented on a computer, such as an edge computer, fog computer, host computer, or cloud server (implemented as a part of a fog computer 7 in the example shown in FIG. 12), a plurality of abnormality determination devices 1, and a wired/wireless network 5 connecting those abnormality determination devices 1 and the computer.

In the abnormality determination system 500" having the above structure, the fog computer 7 with the machine learning device 100' acquires learning models obtained as a result of machine learning by the respective machine learning devices 100 of the individual abnormality determination devices 1 from the abnormality determination devices 1. The machine learning device 100' of the fog computer 7 generates newly optimized or streamlined learning models by performing processing for optimizing or streamlining knowledge based on those learning models and distributes the generated learning models to the individual abnormality determination devices 1.

Generation of distillation models based on a plurality of learning models acquired from each abnormality determination device 1 can be given as an example of optimization or streamlining of the learning models by the machine learning device 100'. In this case, the machine learning device 100' according to the present embodiment creates input data to be input to the learning models and newly generates learning models (distillation models) by performing learning from the beginning using outputs obtained as a result of input of the input data to the individual learning models. As is also described above, the distillation models generated in this manner are distributed to the abnormality determination devices 1 and other computers through an external storage medium or the network 5 and used therein.

As another presumable example of the optimization or streamlining of the learning models by the machine learning device 100', distribution of output data of the individual learning models relative to the input data are analyzed by a conventional statistical method (e.g., outlier test) in the process of distillation of a plurality of learning models acquired from each abnormality determination device 1, outliers in a set of input and output data are extracted, and distillation is performed using the set of input and output data from which those outliers are excluded. By going through this process, it becomes possible to exclude an exceptional result of estimation from the sets of input and output data obtained from the individual learning models and generate distillation models using the sets of input and output data from which the exceptional result of estimation is excluded. The distillation models generated in this manner can be used as more general-purpose learning models than the learning models generated by the plurality of abnormality determination devices 1.

Also, some other conventional methods for optimizing or streamlining learning models (e.g., analysis of each learning model and hyper parameter optimization of the learning model based on the result of the analysis) can be suitably introduced.

In the abnormality determination system 500" according to the present embodiment, it is possible, as an operation to be made, for example, to dispose the machine learning device 100' on the fog computer 7 installed for a plurality of abnormality determination devices 1 as edge computers to intensively store learning models generated in each abnormality determination device 1 on the fog computer 7, thereby performing optimization or streamlining based on the stored learning models to redistribute the optimized or streamlined learning models as required to each abnormality determination device 1.

Moreover, in the abnormality determination system 500" according to the present embodiment, the learning models intensively stored on the fog computer 7 and the learning models optimized or streamlined on the fog computer 7 are collected on the host computer or cloud server in the further upper layer, and these learning models can be used for application to intellectual work in a factory or the manufacturer of the abnormality determination devices 1 (application to construction and redistribution of more general-purpose learning models in a top server, support of maintenance work based on the result of the analysis of the learning models, analysis of the performance of each abnormality determination device 1, development of novel machines, etc.).

While embodiments of the present invention have been described above, the invention is not limited to the examples of the above-described embodiments and may be suitably modified and embodied in various forms.

For example, while the abnormality determination device 1 and the machine learning device 100 are described as devices comprising different CPUs (processors) in the embodiments described above, the machine learning device 100 may be implemented by the CPU 11 of the abnormality determination device 1 and the system programs stored in the ROM 12.

The invention claimed is:

1. An abnormality determination device configured to determine abnormality of an industrial machine, the abnormality determination device comprising:
   a processor configured to:
      acquire, as observation data, continuous data on an operation of the industrial machine observed during the operation,
      extract, from the observation data, partial time-series data including a portion representative of a feature of an operating state at a predetermined specified timing, and
      calculate at least one statistical amount from the partial time-series data, wherein the processor comprises a machine learning device configured to perform processing for machine learning related to determination of operation abnormality of the industrial machine, based on the calculated statistical amount,
      wherein the machine learning device is further configured, as the machine learning processing, to generate a learning model that has learned the calculated statistical amount.

2. The abnormality determination device according to claim 1, wherein the machine learning device is further configured to
   calculate, as the machine learning processing, a rate of divergence of the statistical amount learned by machine learning from normality, based on the calculated statistical amount, and
   determine machine abnormality of the industrial machine based on the calculated rate of divergence.

3. The abnormality determination device according to claim 1, wherein
   the calculated statistical amount is at least one of values including a maximum value, minimum value, local maximal value, local minimal value, average value, deviation, kurtosis, skewness, and value calculated by combining these values.

4. The abnormality determination device according to claim 1, wherein
   the processor is further configured to correct the observation data in accordance with operating conditions of the industrial machine.

5. The abnormality determination device according to claim 1, wherein
   the processor is configured to cut the partial time-series data with a predetermined specified duration relating to occurrence of abnormality, and the predetermined specified duration is set previously in consideration of an operating characteristics of the industrial machine.

6. The abnormality determination device according to claim 1, wherein
   the machine learning device is removable from the abnormality determination device.

7. The abnormality determination device according to claim 1, wherein
   the processor is configured to correct the observation data so that rates of divergence of the statistical amount calculated by the machine learning device take similar values when similar abnormal states are generated in different operation conditions.

8. An abnormality determination system, comprising:
a plurality of devices connected to one another through a network, wherein
the plurality of devices include at least one abnormality determination device configured to determine abnormality of an industrial machine, the at least one abnormality determination device comprising a first abnormality determination device,
the first abnormality determination device comprising a processor configured to
acquire, as observation data, continuous data on an operation of the industrial machine observed during the operation; and
extract, from the observation data, partial time-series data including a portion representative of a feature of an operating state at a predetermined specified timing, and
calculate at least one statistical amount from the partial time-series data,
wherein the processor comprises a machine learning device configured to perform processing for machine learning related to determination of operation abnormality of the industrial machine, based on the calculated statistical amount, and
the machine learning device is further configured, as the machine learning processing, to generate a learning model that has learned the calculated statistical amount.

9. The abnormality determination system according to claim 8, wherein
the plurality of devices further include a computer comprising a machine learning device,
the computer is configured to acquire the learning model, generated as a result of the machine learning, of the first abnormality determination device, and
the machine learning device of the computer is configured to perform optimization or streamlining based on the acquired learning model.

10. The abnormality determination system according to claim 9, wherein
the machine learning device of the computer is configured to perform a distillation process to exclude an exceptional result of estimation from sets of input and output data from individual learning models, and generate distillation models.

11. The abnormality determination system according to claim 8, wherein
the at least one abnormality determination device included in the plurality of devices further includes a second abnormality determination device different from the first abnormality determination device, and
the result of the machine learning by the first abnormality determination device is shared with the second abnormality determination device.

12. The abnormality determination system according to claim 8, wherein
the at least one abnormality determination device included in the plurality of devices further includes a second abnormality determination device different from the first abnormality determination device, and
data observed in the second abnormality determination device are available for the machine learning by the first abnormality determination device through the network.

* * * * *